United States Patent
Liu et al.

(10) Patent No.: US 10,142,094 B2
(45) Date of Patent: Nov. 27, 2018

(54) SYNCHRONIZATION ERROR REDUCTION IN COMMON PUBLIC RADIO INTERFACE (CPRI) PASSIVE OPTICAL NETWORKS (PONS)

(71) Applicant: Futurewei Technologies, Inc., Plano, TX (US)

(72) Inventors: Xiang Liu, Marlboro, NJ (US); Frank Effenberger, Frisco, TX (US); Huaiyu Zeng, Red Bank, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/833,173

(22) Filed: Dec. 6, 2017

(65) Prior Publication Data

US 2018/0212748 A1    Jul. 26, 2018

Related U.S. Application Data

(60) Provisional application No. 62/449,863, filed on Jan. 24, 2017.

(51) Int. Cl.
*H04B 10/27* (2013.01)
*H04B 10/2507* (2013.01)
(Continued)

(52) U.S. Cl.
CPC ....... *H04L 7/0075* (2013.01); *H04B 10/2507* (2013.01); *H04J 14/0227* (2013.01); *H04B 10/27* (2013.01)

(58) Field of Classification Search
CPC . H04B 10/27; H04B 10/2507; H04J 14/0227; H04L 7/0075
(Continued)

(56) References Cited

U.S. PATENT DOCUMENTS

2009/0162065 A1* 6/2009 Mizutani ............... H04J 3/0655
398/66
2010/0040369 A1* 2/2010 Zhao .................... H04J 3/0664
398/58
(Continued)

FOREIGN PATENT DOCUMENTS

CN          101873166 A      10/2010

OTHER PUBLICATIONS

"Common Public Radio Interface—802.1CM Sync Requirement Improvement," CPRI Common Public Radio Interface, Oct. 11, 2016, 6 pages.
(Continued)

*Primary Examiner* — Dalzid Singh
(74) *Attorney, Agent, or Firm* — Conley Rose, P.C.

(57) ABSTRACT

A first apparatus comprises: a processor configured to generate a first synchronization message; a transmitter coupled to the processor and configured to transmit the first synchronization message to a second apparatus at a first wavelength; and a receiver coupled to the processor and configured to receive a second synchronization message from the second apparatus at a second wavelength and in response to the first synchronization message, the first wavelength and the second wavelength are based on a reduction of a latency difference between the second synchronization message and the first synchronization message, and the processor is further configured to calculate a TO between the first apparatus and the second apparatus based on the reduction.

20 Claims, 10 Drawing Sheets

(51) Int. Cl.
*H04L 7/00* (2006.01)
*H04J 14/02* (2006.01)

(58) Field of Classification Search
USPC .......................................................... 398/79
See application file for complete search history.

(56) References Cited

U.S. PATENT DOCUMENTS

| | | | |
|---|---|---|---|
| 2012/0057865 A1* | 3/2012 | Hasegawa | H04J 3/0655 398/16 |
| 2015/0104167 A1* | 4/2015 | Bottari | H04B 10/0775 398/16 |
| 2015/0207714 A1 | 7/2015 | Ruffini et al. | |
| 2017/0063481 A1* | 3/2017 | Pauwels | H04J 3/0673 |
| 2018/0145757 A1* | 5/2018 | Weeber | H04B 10/27 |

OTHER PUBLICATIONS

Farkas, et al, "P802.1CM Time-Sensitive Networking for Fronthaul," Mar. 14, 2016, 10 pages.
Zhou, "Method of a Unified Mobile and TDM-PON Uplink MAC Scheduling for Mobile Front-Haul," U.S. Appl. No. 62/395,058, filed Sep. 15, 2016, 28 pages.
Zhou, et al., "Mobile-PON: A High-Efficiency Low-Latency Mobile Fronthaul Based on Functional Split and TDM-PON with a Unified Scheduler," Mar. 19, 2017, 3 pages.
Machine Translation and Abstract of Chinese Publication No. CN101873166, Oct. 27, 2010, 13 pages.
Foreign Communication From a Counterpart Application, PCT Application No. PCT/CN2018/073244, English Translation of International Search Report dated Apr. 18, 2018, 5 pages.
Foreign Communication From a Counterpart Application, PCT Application No. PCT/CN2018/073244, English Translation of Written Opinion dated Apr. 18, 2018, 4 pages.

\* cited by examiner

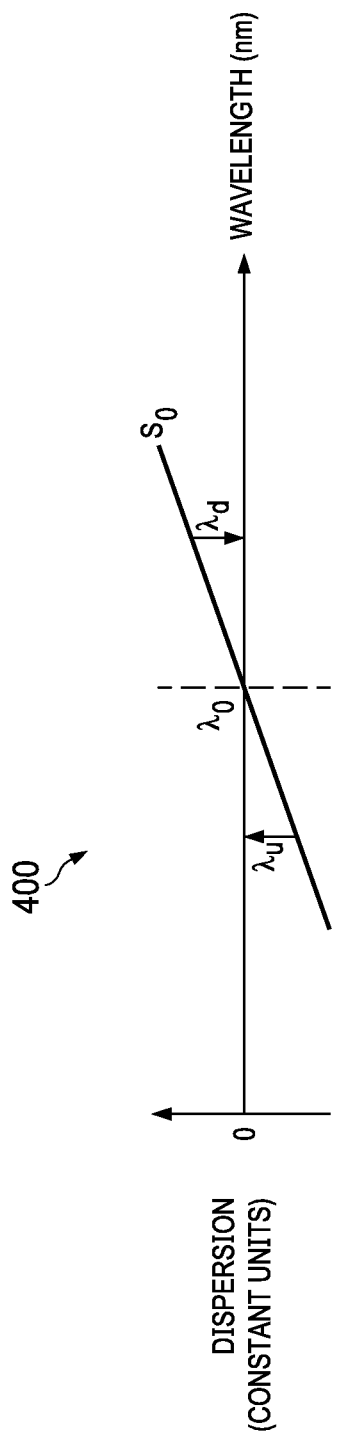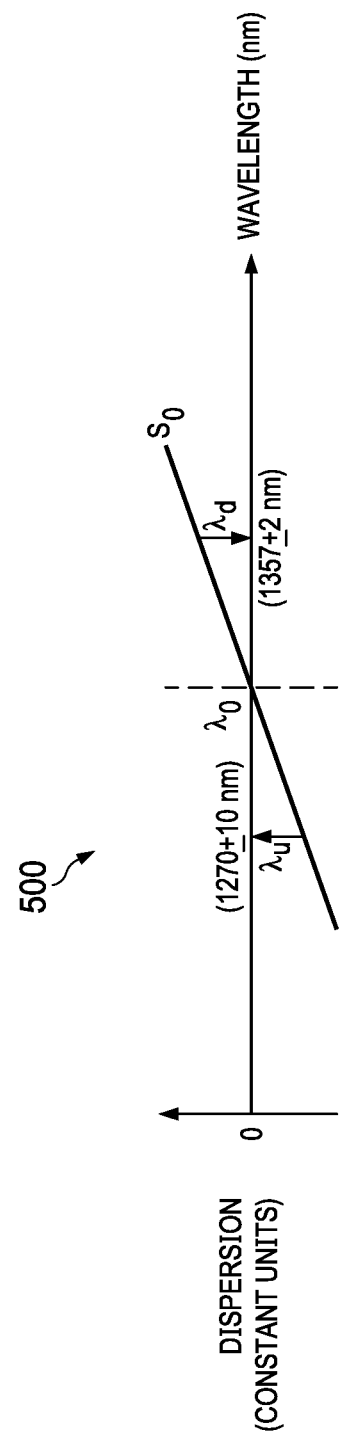

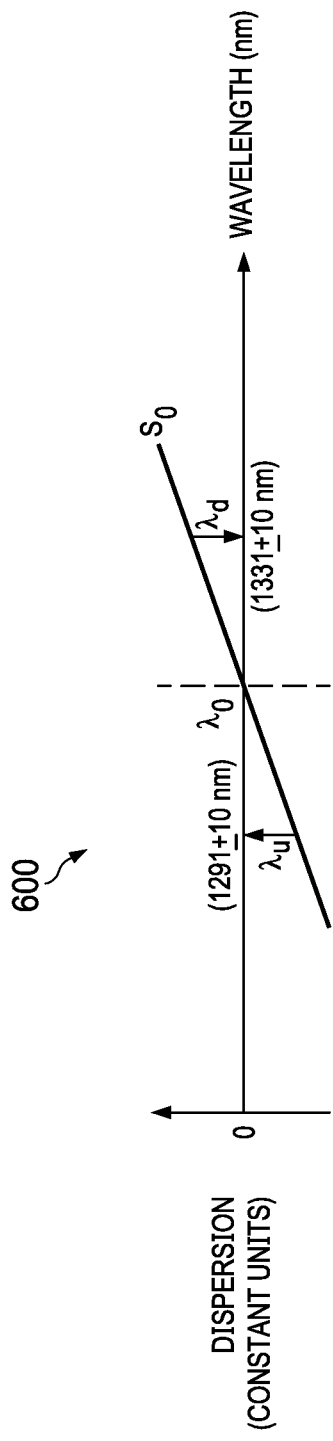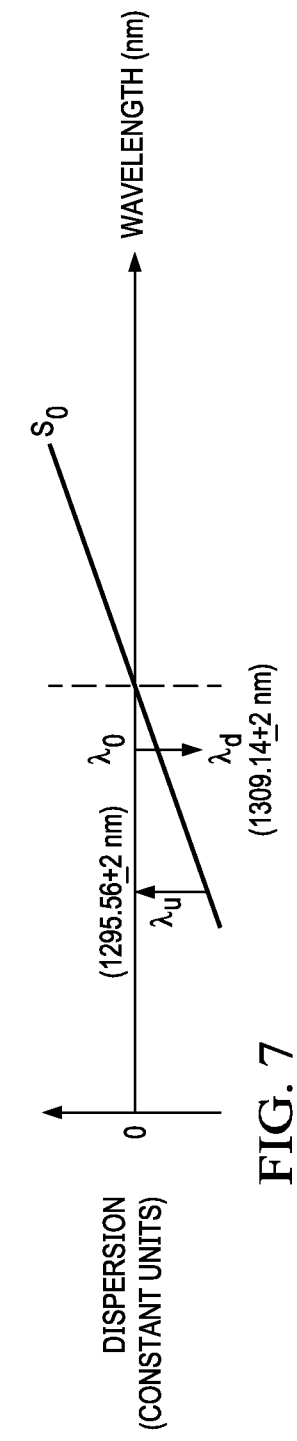

SYNCHRONIZATION ERROR REDUCTION IN COMMON PUBLIC RADIO INTERFACE (CPRI) PASSIVE OPTICAL NETWORKS (PONS)

CROSS-REFERENCE TO RELATED APPLICATIONS

This application claims priority to U.S. provisional patent application No. 62/449,863 filed on Jan. 24, 2017 by Futurewei Technologies, Inc. and titled "Synchronization Error Reduction in Common Public Radio Interface (CPRI) Passive Optical Networks (PONs)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A RAN is a network between mobile devices and a core network. In the RAN, wireless base stations located at remote cell sites perform digital baseband processing. However, in a C-RAN, RRUs replace the wireless base stations and centralized BBUs located at central sites near the core network perform the digital baseband processing. The RRUs interface with antennas for wireless RF transmission and reception. The RRUs require limited digital baseband processing.

In the C-RAN, a fronthaul connects the BBUs to the RRUs. CPRI, a standard for fronthauls, describes digitizing wireless channels to create digitized channels, aggregating the digitized channels to create aggregated channels, and communicating the aggregated channels using aggregated fiber optical channels or aggregated microwave channels. The aggregated channels have high data rates that necessitate complex communications systems.

SUMMARY

In one embodiment, the disclosure includes a first apparatus comprising: a processor configured to generate a first synchronization message; a transmitter coupled to the processor and configured to transmit the first synchronization message to a second apparatus at a first wavelength; and a receiver coupled to the processor and configured to receive a second synchronization message from the second apparatus at a second wavelength and in response to the first synchronization message, the first wavelength and the second wavelength are based on a reduction of a latency difference between the second synchronization message and the first synchronization message, and the processor is further configured to calculate a TO between the first apparatus and the second apparatus based on the reduction. In some embodiments, the transmitter is further configured to further transmit the first synchronization message through a fiber, and the receiver is further configured to further receive the second synchronization message through the fiber; the first wavelength and the second wavelength are approximately symmetric about a zero-dispersion wavelength of the fiber; the first wavelength is about 1,357±2 nm and the second wavelength is about 1,270±10 nm, the first wavelength is about 1,331±10 nm and the second wavelength is about 1,291±10 nm, or the first wavelength is about 1,309.14±2 nm and the second wavelength is about 1,295.56±2 nm; the first wavelength and the second wavelength are in a same wavelength band, and the wavelength band is centered around the zero-dispersion wavelength; the first apparatus is an OLT or a BBU, and the second apparatus is an ONU or an RRU; the first wavelength and the second wavelength are further based on a minimization of the latency difference, and the processor is further configured to further calculate the TO based on the minimization.

In another embodiment, the disclosure includes a method comprising: generating a first synchronization message; transmitting the first synchronization message at a first wavelength; receiving a second synchronization message at a second wavelength and in response to the first synchronization message, the first wavelength and the second wavelength are based on a reduction of a latency difference between the second synchronization message and the first synchronization message; and calculating a TO based on the reduction. In some embodiments, the method further comprises: further transmitting the first synchronization message through a fiber; and receiving the second synchronization message through the fiber; the first wavelength and the second wavelength are approximately symmetric about a zero-dispersion wavelength of the fiber; the first wavelength is about 1,357±2 nm and the second wavelength is about 1,270±10 nm, the first wavelength is about 1,331±10 nm and the second wavelength is about 1,291±10 nm, or the first wavelength is about 1,309.14±2 nm and the second wavelength is about 1,295.56±2 nm; the first wavelength and the second wavelength are in a same wavelength band, and the wavelength band is centered around the zero-dispersion wavelength; an OLT or a BBU performs the method; the method further comprises: further transmitting the first synchronization message to an ONU or an RRU; and further receiving the second synchronization message from the ONU or the RRU; the first wavelength and the second wavelength are further based on a minimization of the latency difference, and the method further comprises further calculating the TO based on the minimization.

In yet another embodiment, the disclosure includes a method comprises: selecting an upstream wavelength and a downstream wavelength in order to reduce a latency difference between an upstream time delay and a downstream time delay, the upstream time delay is associated with transmission from a first apparatus to a second apparatus, and the downstream time delay is associated with transmission from the second apparatus to the first apparatus; assigning the upstream wavelength to the first apparatus; and assigning the downstream wavelength to the second apparatus. In some embodiments, the method further comprises further selecting the upstream wavelength and the downstream wavelength based on a distance between the first apparatus and the second apparatus; the method further comprises further selecting the upstream wavelength and the downstream wavelength based on a zero-dispersion slope; the method further comprises further selecting the upstream wavelength and the downstream wavelength based on a zero-dispersion wavelength of a fiber connecting the first apparatus and the second apparatus; the method further comprises further selecting the upstream wavelength and the downstream wavelength to be approximately symmetrical about the zero-dispersion wavelength.

Any of the above embodiments may be combined with any of the other above embodiments to create a new embodi-

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a graph of dispersion versus wavelength.

FIG. 5 is a graph demonstrating upstream wavelength selection and downstream wavelength selection according to an embodiment of the disclosure.

FIG. 6 is a graph demonstrating upstream wavelength selection and downstream wavelength selection according to another embodiment of the disclosure.

FIG. 7 is a graph demonstrating upstream wavelength selection and downstream wavelength selection according to yet another embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ADC: analog-to-digital conver(sion,ter)
ASIC: application-specific integrated circuit
BBU: baseband unit
CoMP: coordinated multi-point
CPRI: Common Public Radio Interface
C-RAN: cloud RAN
CP: cyclic prefix
CPRI: Common Public Radio Interface
CPU: central processing unit
CWDM: coarse WDM
DSP: digital signal processing, digital signal processor
eCPRI: evolved CPRI
EMF: efficient mobile fronthaul
EO: electrical-to-optical
EPON: Ethernet PON
FEC: forward error correction
FFT: fast Fourier transform
FPGA: field-programmable gate array
GPON: gigabit-capable PON
IEEE: The Institute of Electrical and Electronics Engineers
km: kilometer(s)
LAN: local area network
MAC: media access control
MIMO: multiple-input and multiple-output
NGFI: Next Generation Fronthaul Interface
nm: nanometer(s)
ns: nanosecond(s)
OC: optical circulator
ODN: optical distribution network
OE: optical-to-electrical
OLT: optical line terminal
ONU: optical network unit
PDCP: packet data convergence protocol
PON: passive optical network
ps: picosecond(s)
QAM: quadrature amplitude modulation
RAM: random-access memory
RAN: radio access network
RF: radio frequency
RLC: radio link control
ROM: read-only memory
RRU: remote radio unit
RX: receiver unit
SRAM: static RAM
TCAM: ternary content-addressable memory
TDM: time-division multiplexing
TDMA: time-division multiple access
TE: timing error
TO: timing offset
TX: transmitter unit
UE: user equipment
WDM: wavelength-division multiplex(er,ing)
μs: microsecond(s)
5G: fifth generation.

Mobile fronthauls are crucial segments of C-RANs and enable wireless technologies such as CoMP and advanced MIMO. CPRI is typically used for mobile fronthauls, but CPRI is not bandwidth efficient. NGFI and eCPRI, recent alternatives to CPRI, provide tradeoffs among RRU complexity, system performance, and bandwidth efficiency. In addition, TDM PONs may reduce the costs of mobile fronthauls by allowing RRUs to share ODNs.

eCPRI is based on different functional splits between BBUs and RRUs. For instance, eCPRI positions a split point inside a physical layer. eCPRI provides a higher fronthaul bandwidth efficiency and throughput, enables packet-based transport technologies, and is extensible by allowing software updates via radio networks.

Figure 1:
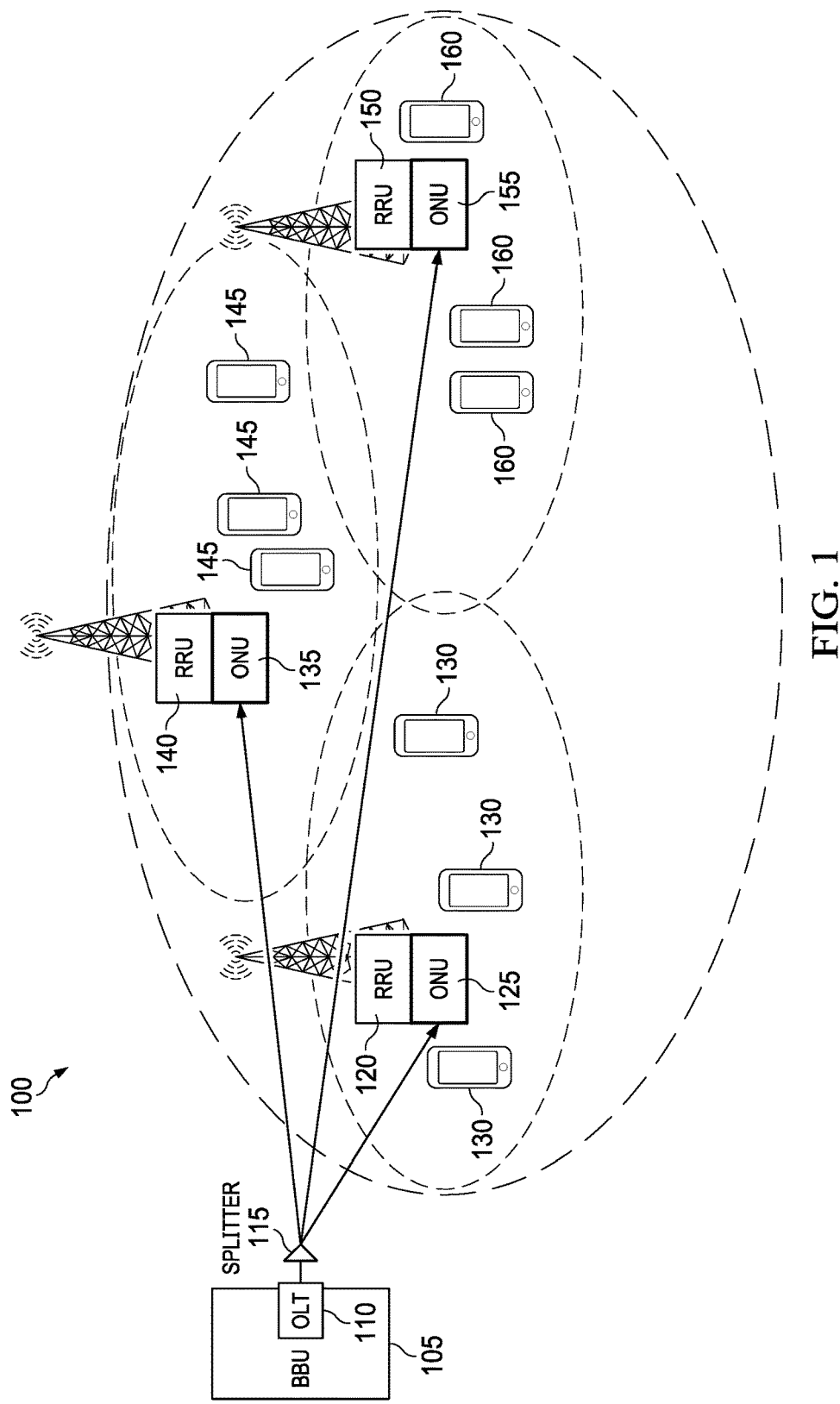
FIG. 1 is a schematic diagram of a C-RAN.

FIG. 1 is a schematic diagram of a C-RAN 100. The C-RAN 100 is described in U.S. provisional patent application No. 62/395,058 filed on Sep. 15, 2016 by Futurewei Technologies, Inc., and titled "Method of a Unified Mobile and TDM-PON Uplink MAC Scheduling for Mobile Fronthaul" ("eCPRI-PON"), which is incorporated by reference. The C-RAN 100 provides mobile fronthauls with high bandwidth efficiency and low processing latency based on NGFI and TDM PON technologies with a unified mobile scheduler.

The C-RAN 100 comprises a BBU 105; a splitter 115; and RRUs 120, 140, 150. The BBU 105 is associated with an OLT 110, the RRU 120 is associated with an ONU 125 and UEs 130, the RRU 140 is associated with an ONU 135 and UEs 145, and the RRU 150 is associated with an ONU 155 and UEs 160. The OLT 110 and the ONU 125 make up a first PON, the OLT 110 and the ONU 135 make up a second PON, and the OLT 110 and the ONU 155 make up a third PON. The UEs 130, 145, 160 are mobile phones or other devices. Communication from the UEs 130, 145, 160 to the BBU 105 occurs as follows. First, the UEs 130, 145, 160 wirelessly communicate with the RRUs 120, 140, 150. Second, the ONUs 125, 135, 155 communicate with the OLT 110 via separate PONs that include the splitter 115. Communication from the BBU 105 to the UEs 130, 145, 160 occurs in a reverse manner.

Figure 2:
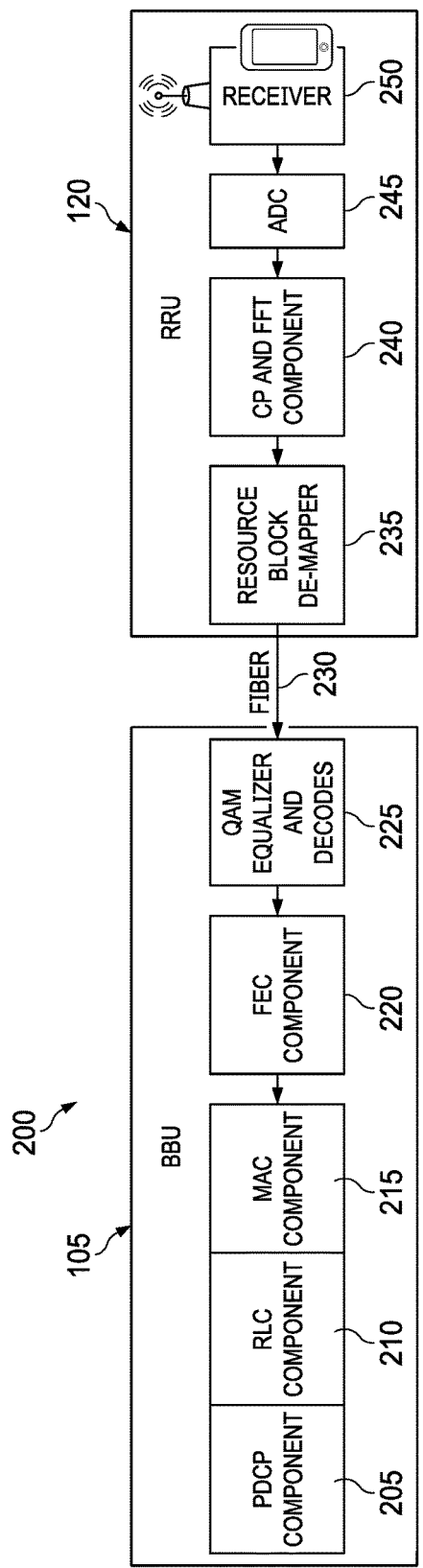
FIG. 2 is a schematic diagram of a portion of the C-RAN in FIG. 1.

FIG. 2 is a schematic diagram of a portion 200 of the C-RAN 100 in FIG. 1. The portion 200 is also described in eCPRI-PON. The portion 200 comprises the BBU 105, a fiber 230, and the RRU 120. The fiber 230 is an optical fiber such as a standard single-mode fiber. Though the RRU 120 is shown in this and subsequent figures, the same concepts apply to the RRUs 140, 150. The portion 200 demonstrates a functional split in physical layers at the fiber 230 and between the BBU 105 and the RRU 120.

The BBU 105 comprises a PDCP component 205, an RLC component 210, a MAC component 215, an FEC component 220, and a QAM equalizer and decoder 225. The RRU 120 comprises a resource block de-mapper 235, a CP and FFT component 240, an ADC 245, and a receiver 250. Communication from the RRU 120 to the BBU 105 occurs as follows. First, in the RRU 120, the receiver 250 receives a wireless signal from a UE, the ADC 245 converts the wireless signal into a digital signal, the CP and FFT component 240 removes a CP and performs FFT, the resource block de-mapper 235 performs resource block de-mapping to create a processed signal, and the RRU 120 transmits the processed signal to the BBU 105. Second, in the BBU 105, the QAM equalizer and decoder 225 performs QAM equalization and decoding, the FEC component 220 performs FEC, the MAC component 215 performs MAC processing, the RLC component 210 performs RLC processing, and the PDCP component 205 performs PDCP processing. Communication from the BBU 105 to the RRU 120 occurs in a reverse manner.

However, for eCPRI-PON to support future 5G or 5G-like applications, accurate synchronization may be needed. In this context, synchronization is the process of setting the clocks in all components of the eCPRI-PON to have an accurate reading of the time of day. In this context, TOs refer to offsets between a clock of the BBU 105 and clocks of the RRUs 120, 140, 150. The BBU 105 calculates the TOs in order to provide synchronization between itself and the RRUs 120, 140, 150. TEs arise when the BBU 105 calculates the TOs. Reducing TEs provides for more accurate TO calculations. "802.1CM Sync requirement improvement," Common Public Radio Interface, Oct. 11, 2016 ("Sync Requirement Improvement"), which is incorporated by reference, proposes a TE of less than 1.5 µs for class C traffic, less than 110 ns for class B traffic, less than 45 ns for class A traffic, and less than 12.5 ns for class A+ traffic. Sync Requirement Improvement is proposed for adoption in IEEE 802.3 cm, which is under development. It is therefore desirable to provide for a TE of less than 12.5 ns.

Disclosed herein are embodiments for synchronization error reduction in CPRI PONs. The CPRI PONs include NGFI PONs and eCPRI PONs. The embodiments provide for selecting downstream wavelengths and upstream wavelengths that reduce or minimize latency differences. The downstream wavelengths and the upstream wavelengths may be symmetrical about a zero-dispersion wavelength or may be the same. Other approaches may not seek to reduce or minimize latency differences because latency differences may typically be small. Reducing or minimizing latency differences provides for more accurate calculations of TOs.

Figure 3:
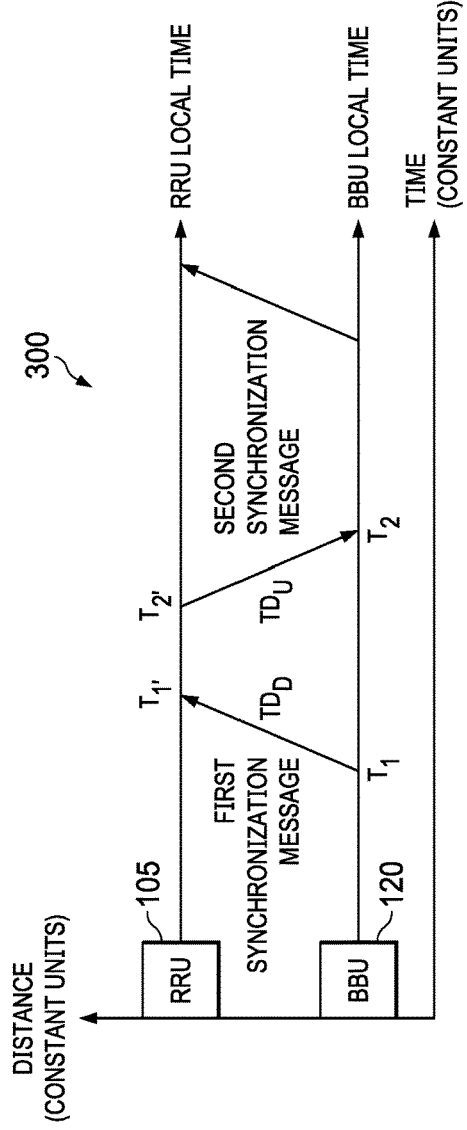
FIG. 3 is a message sequence diagram demonstrating synchronization between the BBU and the RRU in FIG. 1.

FIG. 3 is a message sequence diagram 300 demonstrating synchronization between the BBU 105 and the RRU 120 in FIG. 1. An x-axis represents time in constant units, and a y-axis represents distance in constant units. The BBU 105 initializes TO calculations associated with the RRU 120, and thus initializes the message sequence diagram 300, when the RRU 120 joins the C-RAN 100, at scheduled times, or at other suitable times.

At time $T_1$, a local time of the BBU 105, the BBU 105 transmits a first synchronization message to the RRU 120. The first synchronization message is a TDMA signal and comprises a first timestamp indicating time $T_1$ as the time that the BBU 105 transmitted the first synchronization message. At time $T_1'$, a local time of the RRU 120, the RRU 120 receives the first synchronization message, extracts and records the first timestamp, and generates and records a second timestamp indicating $T_1'$ as the time that the RRU 120 received the first synchronization message.

At time $T_2'$, a local time of the RRU 120 after the time $T_1'$, the RRU 120 transmits a second synchronization message to the BBU 105. The second synchronization message is a burst signal and comprises the first timestamp, the second timestamp, and a third timestamp indicating time $T_2'$ as the time that the RRU 120 transmitted the second synchronization message. At time $T_2$, a local time of the BBU 105, the BBU 105 receives the second synchronization message; extracts and records the first timestamp, the second timestamp, and the third timestamp; and generates and records a fourth timestamp indicating time $T_2$ as the time that the BBU 105 received the second synchronization message.

Based on the first timestamp, the second timestamp, the third timestamp, and the fourth timestamp, the BBU 105 performs the following calculations:

$$T_1'-T_1=TD_D-TO \quad (1)$$

$$T_2-T_2'=TD_U-TO \quad (2)$$

$T_1'$ is the time that the RRU 120 received the first synchronization message; $T_1$ is the time that the BBU 105 transmitted the first synchronization message; $TD_D$ is a time delay, or latency delay or propagation delay, of the first synchronization message traveling downstream from the BBU 105 to the RRU 120; TO is a TO between a clock of the BBU 105 and a clock of the RRU 120; $T_2$ is the time that the BBU 105 received the second message; $T_2'$ is the time that the RRU 120 transmitted the second synchronization message; and $TD_U$ is a time delay, or latency delay or propagation delay, of the second synchronization message traveling upstream from the RRU 120 to the BBU 105. Thus, downstream is a direction from the BBU 105 to the RRU 120, and upstream is a direction from the RRU 120 to the BBU 105. Solving the system of equations (1) and (2), the BBU 105 calculates TO as follows:

$$TO=[(T_1'-T_1-T_2+T_2')-(TD_U-TD_D)]/2 \quad (3)$$

Based on the first timestamp, the second timestamp, the third timestamp, and the fourth timestamp, the BBU 105 knows $T_1'$, $T_1$, $T_2$, and $T_2'$, respectively. However, the BBU 105 may not know $TD_U-TD_D$, which is a latency difference between upstream messages and downstream messages, including between the first synchronization message and the second synchronization message. The BBU 105 may typically calculate TO with an assumption of zero latency difference so that a smaller latency difference yields a smaller calculation error of TO. In addition, a TE is half of the latency difference, so a smaller latency difference also provides a smaller TE. Knowing this, an operator of the C-RAN 100 may design the C-RAN 100 to reduce the latency difference and therefore provide for a more accurate calculation of TO.

The first synchronization message and the second synchronization message occur during a synchronization period between the BBU 105 and the RRU 120. As shown by the far-right arrow in FIG. 3, after the first synchronization message and the second synchronization message, the BBU 105 and the RRU 120 may exchange further messages to complete synchronization. After synchronization, the BBU 105 and the RRU 120 may exchange other control messages or exchange data messages. The control messages may include messages that control components of the C-RAN 100 such as by controlling signal power levels of antennas. The data messages include data that a user associated with the RRU 120 desires to communicate with another user or endpoint.

FIG. 4 is a graph 400 of dispersion versus wavelength. The x-axis represents wavelength in constant units, and the y-axis represents dispersion in constant units. The graph 400 shows an upstream wavelength $\lambda_u$, the zero-dispersion wavelength $\lambda_0$ of the fiber 230, a downstream wavelength $\lambda_d$, and the zero-dispersion slope $S_0$. $S_0$ is defined as the change of dispersion with respect to wavelength near the zero-dispersion wavelength. $\lambda_0$ is between 1,302 nm and 1,322 nm, and $S_0$ is less than or equal to 0.089 ps/(nm²·km). The latency difference is calculated as follows:

$$(TD_U-TD_D)=L \cdot S_0 \cdot [(\lambda_d-\lambda_0)^2-(\lambda_u-\lambda_0)^2]/2 \quad (4)$$

L is a distance of the fiber 230 in kilometers. Looking at equation (4), it can be seen that either making $\lambda_d$ and $\lambda_u$ symmetric about $\lambda_0$ or making $\lambda_d$ and $\lambda_u$ equal will reduce or minimize the latency difference and thus reduce or minimize the calculation error of TO. Four embodiments for selecting $\lambda_u$ and $\lambda_d$ are described below.

FIG. 5 is a graph 500 demonstrating upstream wavelength selection and downstream wavelength selection according to an embodiment of the disclosure. The x-axis represents wavelength in constant units, and the y-axis represents dispersion in constant units. A typical EPON or GPON $\lambda_u$ may be 1,270±10 nm as shown in the graph 500. A $\lambda_d$ symmetrical about $\lambda_0$ is 1,357±2 nm. In that case, the worst-case latency differences are $$(TD_U - TD_D) = 20 \cdot 0.089 \cdot [(1,359 - 1,302)^2 - (1,280 - 1,302)^2]/2$$
$$= 2.46 \text{ ns}$$

$$(TD_U - TD_D) = 20 \cdot 0.089 \cdot [(1,355 - 1,322)^2 - (1,260 - 1,322)^2]/2$$
$$= -2.45 \text{ ns}$$

Thus, both the calculation error of TO and the TE are within ±1.25 ns, which is about half of the latency difference. The TE is only about 10% of the TE maximum of 12.5 ns. The calculations above assume a typical value of 20 km for L.

FIG. 6 is a graph 600 demonstrating upstream wavelength selection and downstream wavelength selection according to another embodiment of the disclosure. The x-axis represents wavelength in constant units, and the y-axis represents dispersion in constant units. A typical CWDM $\lambda_u$ may be 1,291±10 nm and a typical CWDM $\lambda_d$ may be 1,331±10 nm as shown in the graph 600. In that case, the worst-case latency differences are $$(TD_U - TD_D) = 20 \cdot 0.089 \cdot [(1,341 - 1,302)^2 - (1,291 - 1,302)^2]/2$$
$$= 1.25 \text{ ns}$$

$$(TD_U - TD_D) = 20 \cdot 0.089 \cdot [(1,321 - 1,322)^2 - (1,281 - 1,322)^2]/2$$
$$= -1.5 \text{ ns}$$

Thus, the calculation error of TO is within ±0.75 ns, which is less than 6% of the TE maximum of 12.5 ns.

FIG. 7 is a graph 700 demonstrating upstream wavelength selection and downstream wavelength selection according to yet another embodiment of the disclosure. The x-axis represents wavelength in constant units, and the y-axis represents dispersion in constant units. A typical LAN WDM $\lambda_u$ for a first channel may be 1,295.56±2 nm and a typical LAN WDM $\lambda_d$ for a fourth channel may be 1,309.14 nm±2 nm. In that case, the worst-case latency difference is $$(TD_U - TD_D) = 20 \cdot 0.089 \cdot [(1,311.14 - 1,322)^2 - (1,293.56 - 1,322)^2]/2$$
$$= -0.615 \text{ ns}$$

Thus, the calculation error of TO is about ±0.31 ns, which is less than 2.5% of the TE maximum of 12.5 ns.

Figure 8:
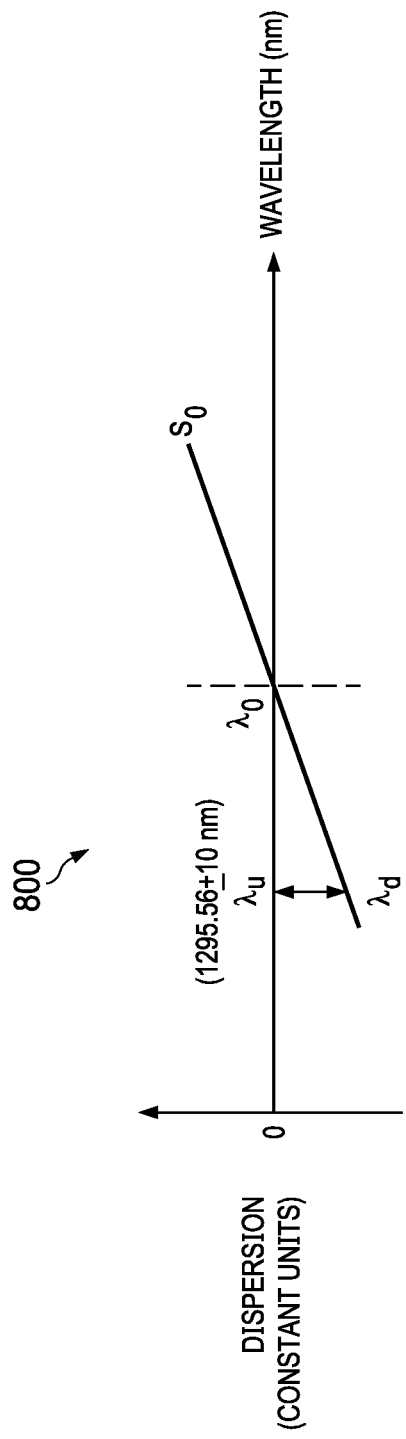
FIG. 8 is a graph demonstrating upstream wavelength and downstream wavelength selection according to yet another embodiment of the disclosure.

FIG. 8 is a graph 800 demonstrating upstream wavelength and downstream wavelength selection according to yet another embodiment of the disclosure. The x-axis represents wavelength in constant units, and the y-axis represents dispersion in constant units. A typical LAN WDM $\lambda_u$ for a first channel may be 1,295.56±2 nm and a typical LAN WDM $\lambda_d$ for the first channel may also be 1,295.56 nm±2 nm. In that case, the worst-case latency difference is $$(TD_U - TD_D) = 20 \cdot 0.089 \cdot [(1,293.56 - 1,322)^2 - (1,297.56 - 1,322)^2]/2$$
$$= \pm 0.188 \text{ ns}$$

Thus, the calculation error of TO is about ±0.1 ns, which is less than 1% of the TE maximum of 12.5 ns.

Because $\lambda_u$ and $\lambda_d$ are the same, OCs at the BBU 105 and the RRU 120 may separate downstream messages from upstream message. $\lambda_u$ and $\lambda_d$ may be in a wavelength band centered around $\lambda_0$. When a bandwidth of the wavelength band is sufficiently small, the TE due to the latency difference may meet the TE requirements.

Figure 9:
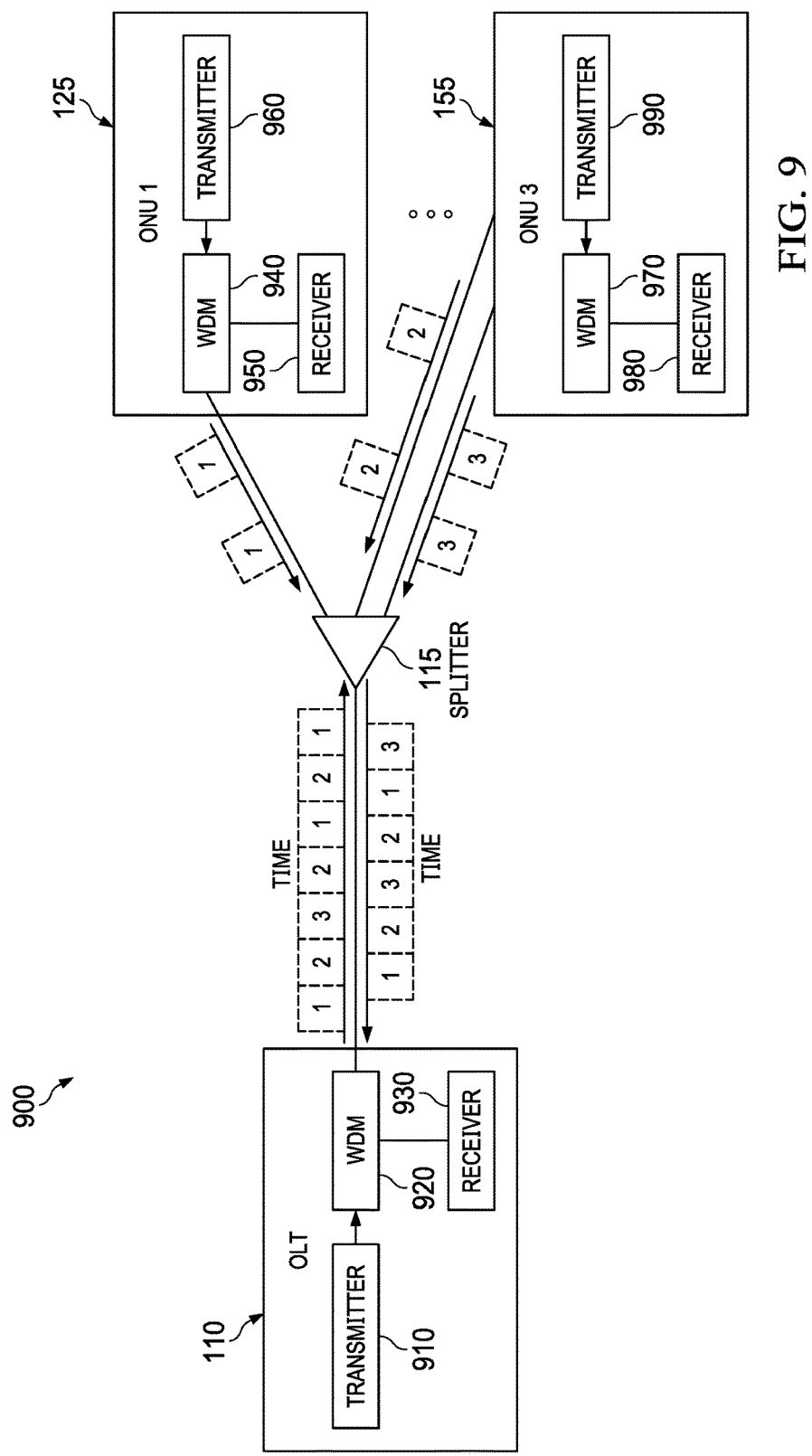
FIG. 9 is a schematic diagram of a PON according to an embodiment of the disclosure.

FIG. 9 is a schematic diagram of a PON 900 according to an embodiment of the disclosure. The PON 900 implements the wavelength selections shown in the graphs 500, 600, 700. The PON 900 comprises the OLT 110; the splitter 115; and the ONUs 125-155. The OLT 110 comprises a transmitter 910, a WDM 920, and a receiver 930. The ONU 125 comprises a WDM 940, a receiver 950, and a transmitter 960. The ONU 155 comprises a WDM 970, a receiver 980, and a transmitter 990. The OLT 110 labels packets and transmits the packets downstream to the ONUs 125-155 using TDM. The ONUs 125-155 then filter the packets. The ONUs 125-155 transmit packets to the OLT 110 using TDMA to avoid collisions. The downstream packets and the upstream packets use different wavelengths.

Figure 10:
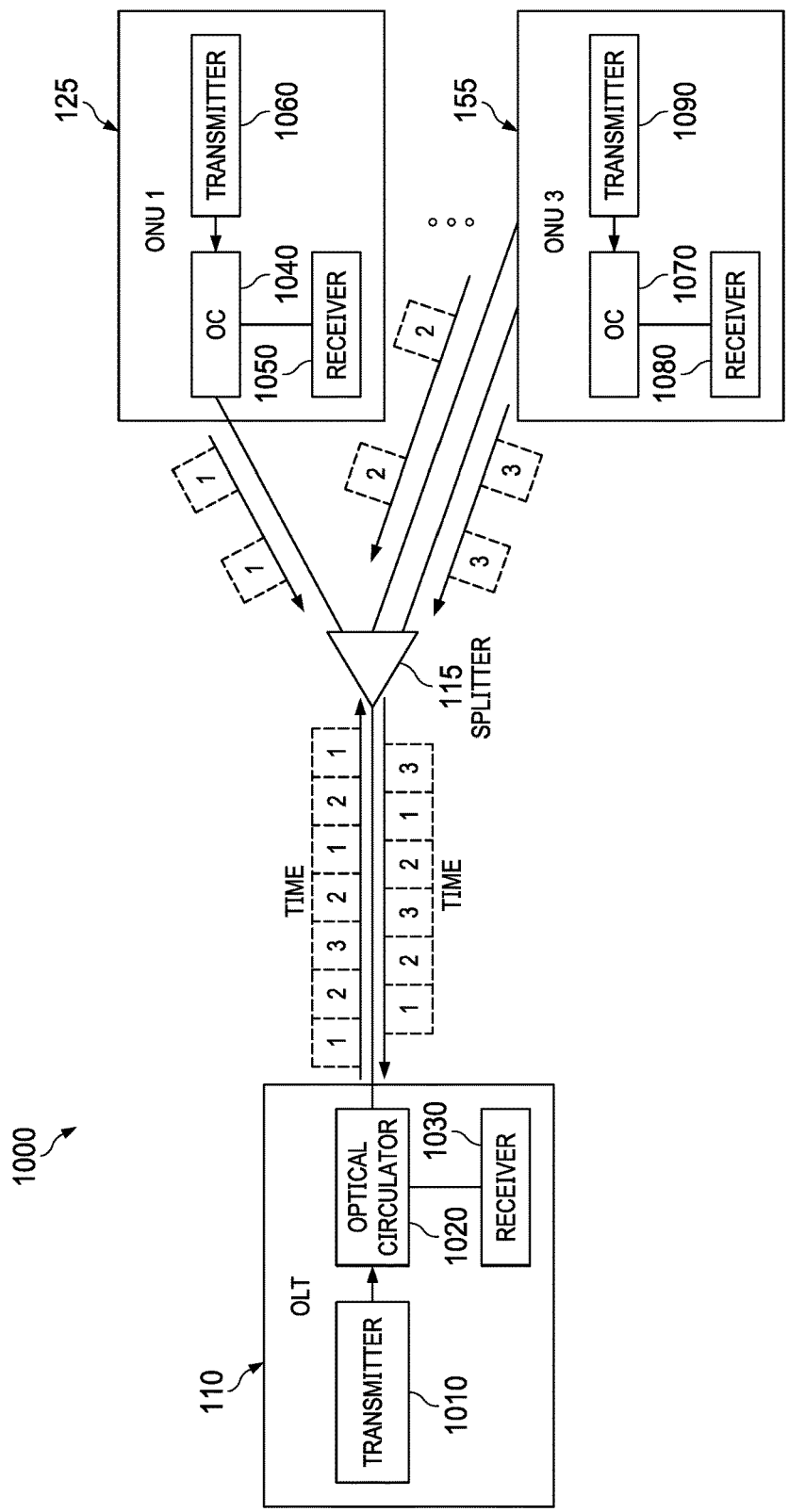
FIG. 10 is a schematic diagram of a PON according to another embodiment of the disclosure.

FIG. 10 is a schematic diagram of a PON 1000 according to another embodiment of the disclosure. The PON 1000 implements the wavelength selections shown in the graph 800. The PON 1000 is similar to the PON 900 in FIG. 9. Specifically, the PON 1000 comprises the OLT 110; the splitter 115; and the ONUs 125-155. The OLT 110 comprises a transmitter 1010 and a receiver 1030, the ONU 125 comprises a receiver 1050 and a transmitter 1060, and the ONU 155 comprises a receiver 1080 and a transmitter 1090. However, unlike the OLT 110 and the ONUs 125-155 in FIG. 9, which respectively comprise the WDMs 920, 940, 970, the OLT 110 and the ONUs 125-155 in FIG. 10 respectively comprise OCs 1020, 1040, 1070. The OCs 1020, 1040, 1070 enable downstream packets and upstream packets to use the same wavelength.

Figure 11:
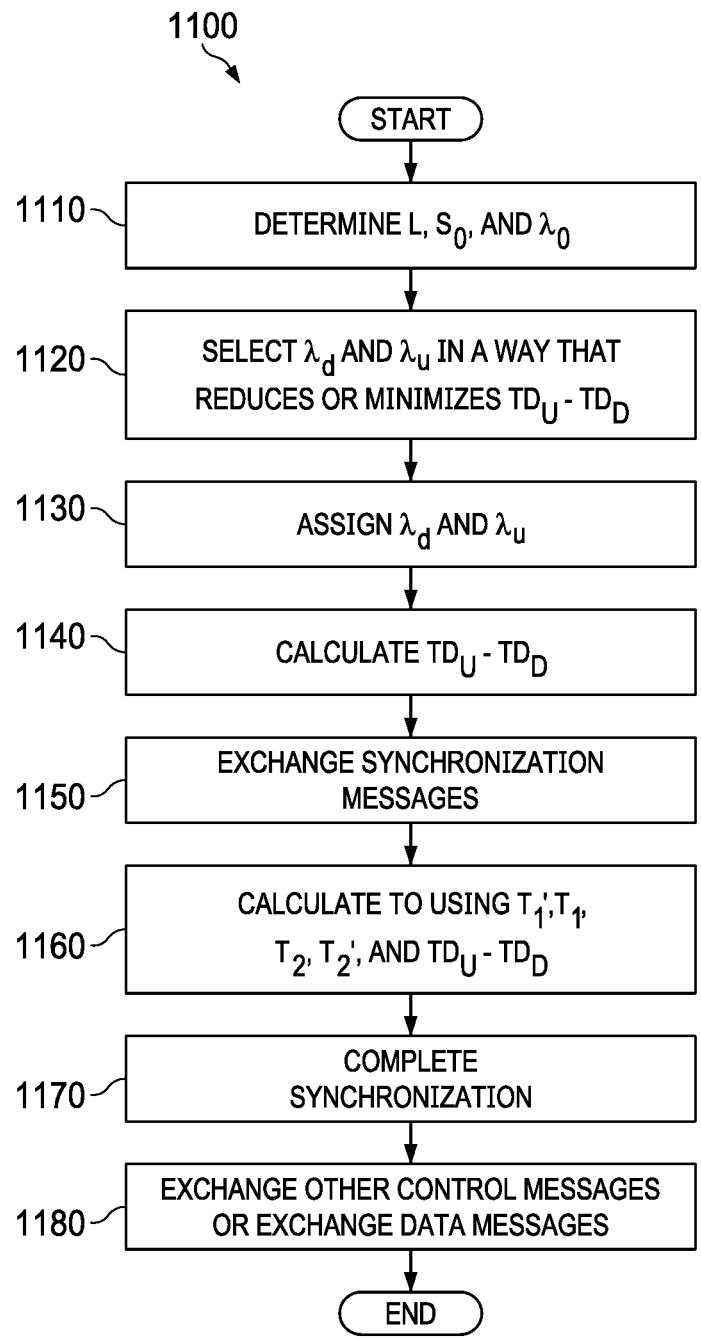
FIG. 11 is a flowchart illustrating a method of synchronization and communication according to an embodiment of the disclosure.

FIG. 11 is a flowchart illustrating a method 1100 of synchronization and communication according to an embodiment of the disclosure. The BBU 105 performs the method 1100. At step 1110, L, $S_0$, and $\lambda_0$ are determined. For instance, the BBU 105 determines L, $S_0$, and $\lambda_0$ as described above. At step 1120, $\lambda_d$ and $\lambda_u$ are selected in a way that reduces or minimizes $TD_U-TD_D$. For instance, the BBU 105 selects $\lambda_d$ and $\lambda_u$ as described with respect to FIGS. 4-8. Alternatively, $\lambda_d$ and $\lambda_u$ are selected in a way that reduces $TD_U-TD_D$. At step 1130, $\lambda_d$ and $\lambda_u$ are assigned. For instance, the BBU 105 assigns $\lambda_d$ to the BBU 105 and $\lambda_u$ to the RRU 120. At step 1140, $TD_U-TD$ is calculated. Alternatively, because $\lambda_d$ and $\lambda_u$ are selected in a way that reduces or minimizes $TD_U-TD_D$ at step 1120, $TD_U-TD$ may be assumed to be zero or otherwise negligible.

At step 1150, synchronization messages are exchanged. For instance, the BBU 105 exchanges the messages with the RRU 120 as shown in the message sequence diagram 300 in FIG. 3. By performing step 1150, the BBU 105 determines $T_1'$, $T_1$, $T_2$, and $T_2'$. At step 1160, TO is calculated using $T_1'$, $T_1$, $T_2$, $T_2'$, and $TD_U-TD_D$. For instance, the BBU 105 calculates TO using equation (3). Alternatively, if $TD_U-TD$ is assumed to be zero or otherwise negligible, then TO is calculated using $T_1'$, $T_1$, $T_2$, $T_2'$. At step 1170, synchronization is completed. For instance, knowing TO, the BBU 105 instructs the RRU 120 to adjust its clock. Finally, at step 1180, other control messages or data messages are exchanged.

Though the BBU 105 is described as performing the method 1100, an operator of the C-RAN 100, another device in the C-RAN 100 such as the OLT 110, or another entity may perform some or all of the steps in the method 1100. For instance, the operator may determine and assign $\lambda_d$ and $\lambda_u$, and the operator may instruct the BBU 105 to implement the assignment. Though specific values of $\lambda_d$ and $\lambda_u$ are given with respect to FIGS. 4-8, the operator may determine $\lambda_d$ and $\lambda_u$ in any way that reduces or minimizes $TD_U-TD$ using equation (4) or otherwise.

Figure 12:
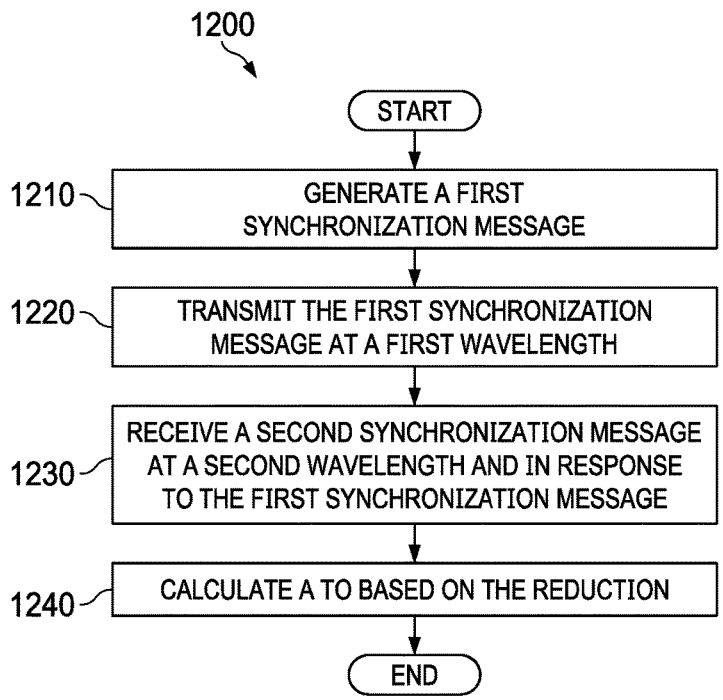
FIG. 12 is a flowchart illustrating a method of synchronization according to an embodiment of the disclosure.

FIG. 12 is a flowchart illustrating a method 1200 of synchronization according to an embodiment of the disclosure. The BBU 105 performs the method 1200. At step 1210, a first synchronization message is generated. For instance, the BBU 105 generates the first synchronization message in the message sequence diagram 300 in FIG. 3. At step 1220, the first synchronization message is transmitted at a first wavelength. For instance, the BBU 105 transmits the first synchronization message to the RRU 120 at the wavelength $\lambda_d$.

At step 1230, a second synchronization message is received at a second wavelength and in response to the first synchronization message. For instance, the BBU 105 receives the second synchronization message at the wavelength $\lambda_u$. The first wavelength and the second wavelength are based on a reduction of a latency difference between the second synchronization message and the first synchronization message, for instance by reducing or minimizing the latency difference according to equation (4).

Finally, at step 1240, a TO is calculated based on the reduction. For instance, the BBU 105 calculates the TO using the first wavelength determined at step 1220, the second wavelength determined at step 1230, and equation (3). Though the BBU 105 is described as performing the method 1200, an operator of the C-RAN 100, another device in the C-RAN 100 such as the OLT 110, or another entity may perform some or all of the steps in the method 1200.

Figure 13:
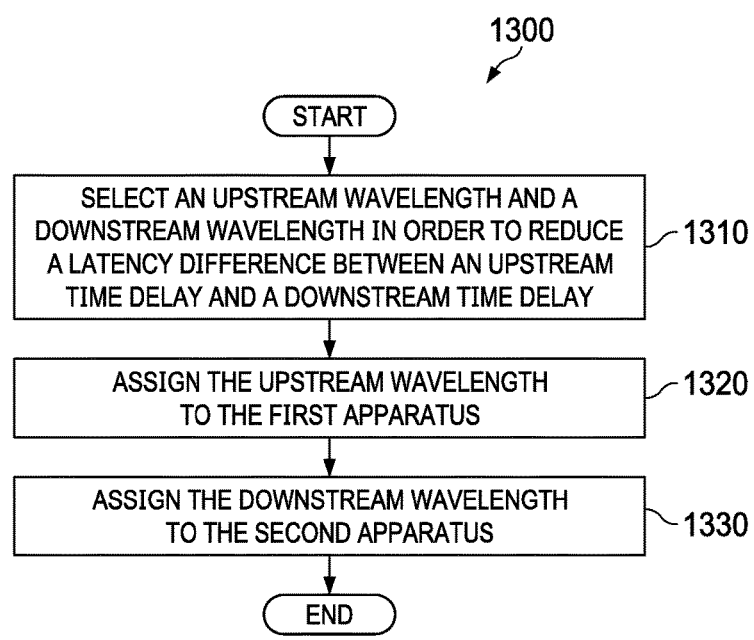
FIG. 13 is a flowchart illustrating a method of synchronization according to another embodiment of the disclosure.

FIG. 13 is a flowchart illustrating a method 1300 of synchronization according to another embodiment of the disclosure. The BBU 105 performs the method 1300. At step 1310, an upstream wavelength and a downstream wavelength are selected in order to reduce a latency difference between an upstream time delay and a downstream time delay. For instance, the BBU 105 selects $\lambda_u$ and $\lambda_d$ in order to reduce the latency difference according to equation (4). The upstream time delay is associated with transmission from a first apparatus to a second apparatus, for instance from the RRU 120 to the BBU 105, and the downstream time delay is associated with transmission from the second apparatus to the first apparatus, for instance from the BBU 105 to the RRU 120.

At step 1320, the upstream wavelength is assigned to the first apparatus. For instance, the BBU 105 assigns $\lambda_u$ to the RRU 120 for upstream transmissions from the RRU 120 to the BBU 105. Finally, at step 1330, the downstream wavelength is assigned to the second apparatus. For instance, the BBU 105 assigns $\lambda_d$ to itself for downstream transmissions from the BBU 105 to the RRU 120. Though the BBU 105 is described as performing the method 1300, an operator of the C-RAN 100, another device in the C-RAN 100 such as the OLT 110, or another entity may perform some or all of the steps in the method 1200.

Figure 14:
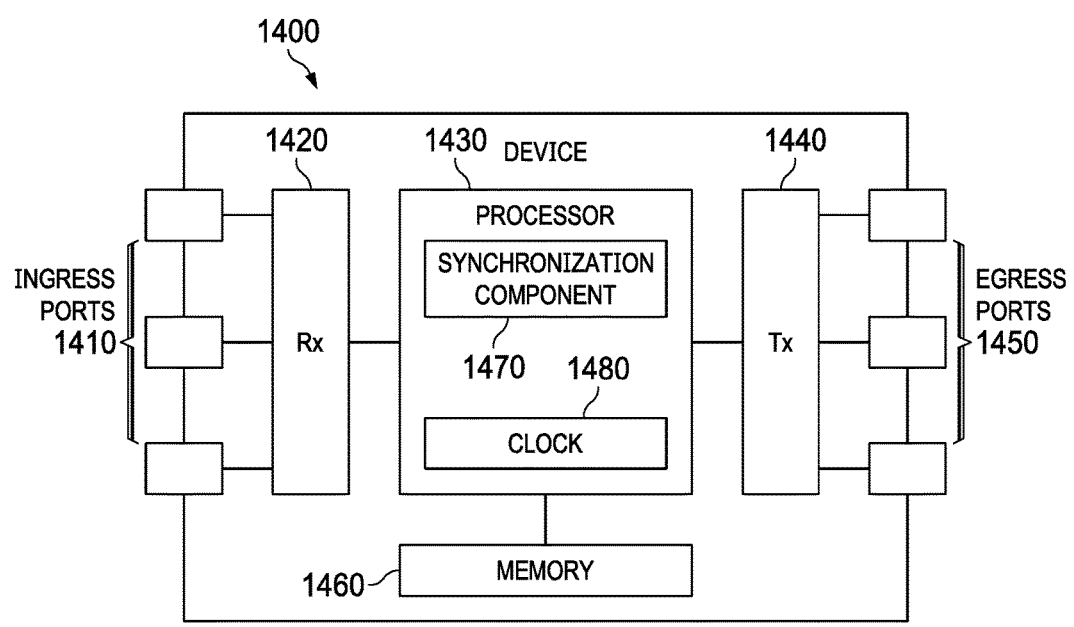
FIG. 14 is a schematic diagram of an apparatus according to an embodiment of the disclosure.

FIG. 14 is a schematic diagram of an apparatus 1400 according to an embodiment of the disclosure. The apparatus 1400 may implement the disclosed embodiments. The apparatus 1400 comprises ingress ports 1410, an RX 1420 coupled to the ingress ports 1410 for receiving data; a processor, logic unit, or CPU 1430 coupled to the RX 1420 to process the data; a TX 1440 coupled to the processor 1430, egress ports 1450 coupled to the TX 1440 for transmitting the data; and a memory 1460 coupled to the processor 1430 for storing the data. The apparatus 1400 may also comprise OE components and EO components coupled to the ingress ports 1410, the RX 1420, the TX 1440, and the egress ports 1450 for ingress or egress of optical or electrical signals.

The processor 1430 is any suitable combination of hardware, middleware, firmware, or software. The processor 1430 comprises any combination of one or more CPU chips, cores, FPGAs, ASICs, or DSPs. The processor 1430 communicates with the ingress ports 1410, RX 1420, TX 1440, egress ports 1450, and memory 1460. The processor 1430 comprises a synchronization component 1470, which implements the disclosed embodiments. The processor 1430 also comprises a clock 1480, which keeps a local time of the apparatus 1400. The inclusion of the synchronization component 1470 and the clock 1480 therefore provides a substantial improvement to the functionality of the apparatus 1400 and effects a transformation of the apparatus 1400 to a different state. Alternatively, the memory 1460 stores the synchronization component 1470 and the clock 1480 as instructions, and the processor 1430 executes those instructions.

The memory 1460 comprises any combination of one or more disks, tape drives, or solid-state drives. The apparatus 1400 may use the memory 1460 as an over-flow data storage component to store programs when the apparatus 1400 selects those programs for execution and to store instructions and data that the apparatus 1400 reads during execution of those programs. The memory 1460 may be volatile or non-volatile and may be any combination of ROM, RAM, TCAM, or SRAM.

A first apparatus comprises: a processing element configured to generate a first synchronization message; a transmitting element coupled to the processing element and configured to transmit the first synchronization message to a second apparatus at a first wavelength; and a receiving element coupled to the processing element and configured to receive a second synchronization message from the second apparatus at a second wavelength and in response to the first synchronization message, the first wavelength and the second wavelength are based on a reduction of a latency difference between the second synchronization message and the first synchronization message, and the processing element is further configured to calculate a TO between the first apparatus and the second apparatus based on the reduction.

The terms "about," "approximately," and their derivatives mean a range including ±10% of the subsequent number unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A first apparatus comprising:
    a processor configured to generate a first synchronization message;
    a transmitter coupled to the processor and configured to transmit the first synchronization message to a second apparatus at a first wavelength; and
    a receiver coupled to the processor and configured to receive a second synchronization message from the second apparatus at a second wavelength and in response to the first synchronization message,
    the first wavelength and the second wavelength are based on a reduction of a latency difference between the second synchronization message and the first synchronization message, and
    the processor is further configured to calculate a timing offset (TO) between the first apparatus and the second apparatus based on the reduction.

2. The first apparatus of claim 1, wherein the transmitter is further configured to further transmit the first synchronization message through a fiber, and wherein the receiver is further configured to further receive the second synchronization message through the fiber.

3. The first apparatus of claim 2, wherein the first wavelength and the second wavelength are approximately symmetric about a zero-dispersion wavelength of the fiber.

4. The first apparatus of claim 3, wherein the first wavelength is about 1,357±2 nanometers (nm) and the second wavelength is about 1,270±10 nm, wherein the first wavelength is about 1,331±10 nm and the second wavelength is about 1,291±10 nm, or wherein the first wavelength is about 1,309.14±2 nm and the second wavelength is about 1,295.56±2 nm.

5. The first apparatus of claim 3, wherein the first wavelength and the second wavelength are in a same wavelength band, and wherein the wavelength band is centered around the zero-dispersion wavelength.

6. The first apparatus of claim 1, wherein the first apparatus is an optical line terminal (OLT) or a baseband unit (BBU), and wherein the second apparatus is an optical network unit (ONU) or a remote radio unit (RRU).

7. The first apparatus of claim 1, wherein the first wavelength and the second wavelength are further based on a minimization of the latency difference, and wherein the processor is further configured to further calculate the TO based on the minimization.

8. A method comprising:
    generating a first synchronization message;
    transmitting the first synchronization message at a first wavelength;
    receiving a second synchronization message at a second wavelength and in response to the first synchronization message, the first wavelength and the second wavelength are based on a reduction of a latency difference between the second synchronization message and the first synchronization message; and
    calculating a timing offset (TO) based on the reduction.

9. The method of claim 8, further comprising:
    further transmitting the first synchronization message through a fiber; and
    receiving the second synchronization message through the fiber.

10. The method of claim 9, wherein the first wavelength and the second wavelength are approximately symmetric about a zero-dispersion wavelength of the fiber.

11. The method of claim 10, wherein the first wavelength is about 1,357±2 nanometers (nm) and the second wavelength is about 1,270±10 nm, wherein the first wavelength is about 1,331±10 nm and the second wavelength is about 1,291±10 nm, or wherein the first wavelength is about 1,309.14±2 nm and the second wavelength is about 1,295.56±2 nm.

12. The method of claim 10, wherein the first wavelength and the second wavelength are in a same wavelength band, and wherein the wavelength band is centered around the zero-dispersion wavelength.

13. The method of claim 8, wherein an optical line terminal (OLT) or a baseband unit (BBU) performs the method.

14. The method of claim 13, further comprising:
further transmitting the first synchronization message to an optical network unit (ONU) or a remote radio unit (RRU); and
further receiving the second synchronization message from the ONU or the RRU.

15. The method of claim 8, wherein the first wavelength and the second wavelength are further based on a minimization of the latency difference, and wherein the method further comprises further calculating the TO based on the minimization.

16. A method comprising:
selecting an upstream wavelength and a downstream wavelength in order to reduce a latency difference between an upstream time delay and a downstream time delay, the upstream time delay is associated with transmission from a first apparatus to a second apparatus, and the downstream time delay is associated with transmission from the second apparatus to the first apparatus;
assigning the upstream wavelength to the first apparatus; and
assigning the downstream wavelength to the second apparatus.

17. The method of claim 16, further comprising further selecting the upstream wavelength and the downstream wavelength based on a distance between the first apparatus and the second apparatus.

18. The method of claim 17, further comprising further selecting the upstream wavelength and the downstream wavelength based on a zero-dispersion slope.

19. The method of claim 18, further comprising further selecting the upstream wavelength and the downstream wavelength based on a zero-dispersion wavelength of a fiber connecting the first apparatus and the second apparatus.

20. The method of claim 19, further comprising further selecting the upstream wavelength and the downstream wavelength to be approximately symmetrical about the zero-dispersion wavelength.

* * * * *